Fig_3.

Nov. 17, 1936.  A. R. THOMPSON ET AL  2,061,490
MACHINE FOR AND METHOD OF FILLING BOXES
Filed Dec. 24, 1934  5 Sheets-Sheet 4

Fig-4.

Fig_11.  Fig_12.

INVENTOR.
Albert R. Thompson
James M. Hait.
BY Philip A. Minnis
ATTORNEY.

Nov. 17, 1936. A. R. THOMPSON ET AL 2,061,490
MACHINE FOR AND METHOD OF FILLING BOXES
Filed Dec. 24, 1934 5 Sheets-Sheet 5

INVENTOR.
Albert. R. Thompson.
James. M. Hait.
BY Philip A. Minnis
ATTORNEY.

Patented Nov. 17, 1936

2,061,490

UNITED STATES PATENT OFFICE 2,061,490

MACHINE FOR AND METHOD OF FILLING BOXES

Albert R. Thompson, San Jose, and James M. Hait, San Marino, Calif., assignors to Food Machinery Corporation, San Jose, Calif., a corporation of Delaware Application December 24, 1934, Serial No. 759,052

36 Claims. (Cl. 226—2)

This invention relates to filling machinery and is particularly concerned with the provision of a machine suitable for filling receptacles such as boxes or the like with articles of a delicate or fragile nature which require careful and gentle handling to avoid damage or injury thereto.

As will hereinafter become apparent, apparatus embodying the invention may be used for filling a wide variety of articles into containers of various kinds. For purposes of convenience, however, the invention will be illustrated and described herein as it may be embodied in a machine more particularly designed for filling fruit such as lemons into boxes.

It may be explained that lemons are picked from the trees according to size while they are still green, whereupon it is the customary procedure to take them to the packing house where they are washed and then sorted by the use of sorting tables which convey the fruit before the sorters, who pick off the fruit by grades according to color and quality. The sorted fruit is loosely filled into boxes which are then stacked up in so called "coloring rooms" where they are allowed to stand until the lemons develop their characteristic yellow color before finally being wrapped and packed for shipment to the market.

As is well known, lemons have extremely tender skins, particularly on their blossom or calyx ends, and are highly susceptible to injuries such as cuts, bruises, abrasions or the like, which rupture or otherwise damage the oil cells in the skin and are promptly followed by rapid rotting or decay. Consequently, great care must be exercised in handling them so as to avoid such injuries, any or all of which may result from scuffing, squeezing, or other rough treatment such as striking the fruit or allowing it to strike against an obstacle with any material force, as may occur for example by dropping the fruit, even for a short distance. For this reason the operation of filling the lemons into boxes, as referred to above, has heretofore been performed by hand by having the sorters manually place the fruit directly into the boxes piece by piece.

Obviously, this is a slow and expensive procedure unsuited to modern production requirements, but has been made necessary by the lack of any known apparatus capable of satisfactorily performing the operation mechanically and without injury to the fruit.

It is, therefore, a primary object of the present invention to provide a machine for mechanically filling articles into boxes or other receptacles.

It is also an object to provide a machine of the character referred to which is adapted to handle articles of a delicate or fragile nature without damage or injury thereto.

Another object is to provide such a machine which is fully automatic, as well as reliable, rapid and efficient in operation.

A further object is to provide a box filling machine which is operable to deliver and deposit articles into the boxes gently and without dropping, scuffing, squeezing, or other rough treatment.

Another object is to provide a box filling machine embodying a lowering device for lowering articles into a box positioned therebeneath, and provided with means for automatically maintaining the level of accumulating articles closely beneath the lowering device during the filling operation.

Another object is to provide a box filling machine embodying a lowering device for lowering articles into a box positioned therebeneath, and provided with mechanism actuated by engagement between the lowering device and articles accumulating in the box therebeneath for automatically maintaining the level of accumulated articles closely beneath the lowering device during the filling operation.

Another object is to provide a box filling machine having a lowering device operable to lower articles into a box positioned therebeneath and to spread said articles gently across the box during the filling operation.

Another object is to provide a box filling machine having mechanism automatically operable to interrupt the delivery of articles when a box is filled to the desired extent.

Another object is to provide a feed mechanism for box filling machines embodying an endless conveying device having article receiving flights for lowering articles into boxes and provided with mechanism for automatically stopping such conveying device with the flights thereof in predetermined positions.

Various other objects and advantages in addition to those enumerated will, it is believed, best be understood and appreciated from a consideration of the following description, taken in connection with the accompanying drawings, wherein is illustrated a practical embodiment of the invention.

Figure 1:
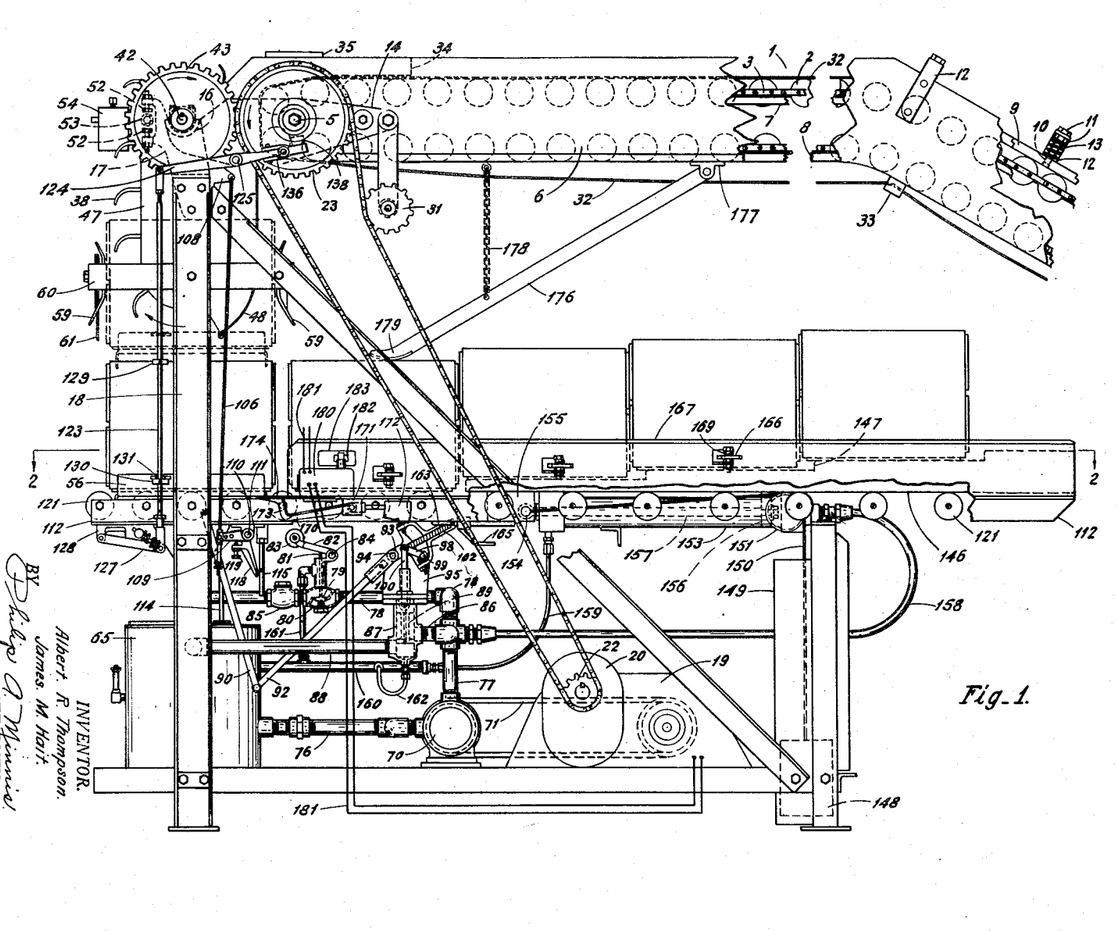
Figure 1 is a side elevation, partly broken away, of a box filling apparatus embodying the principles of the present invention and suitably adapted for filling fruit such as lemons, for example, into boxes.

As best seen in Figure 1, an endless conveyor, generally indicated at 1, is provided for receiving the fruit to be filled into boxes, and comprises a series of conveyor rollers 2 rotatably supported in side by side relation between a pair of endless chains 3 trained around and driven by sprockets 4 secured to a drive shaft 5 which is journalled in spaced side rails 6 extending longitudinally of the conveyor on either side thereof and serving to retain the fruit thereon. The upper and lower reaches of the conveyor chains are supported by and ride over tracks 7 and 8, respectively, which are secured to the inner opposing faces of the side rails 6.

The conveyor 1 may extend to any suitable point for receiving the fruit from the sorting tables, and preferably includes an inclined section as shown, provided with means for imparting reverse rotation to the conveyor rollers as they travel up the incline. Such means may comprise friction rails 9 disposed above the conveyer rollers adjacent opposite ends thereof and slidably mounted on pins 10 secured by nuts 11 to brackets 12 attached to the side rails 6. Springs 13 surround the pins 10 and bear against the lower nuts 11 and the upper faces of the friction rails and serve to maintain the latter in yielding engagement with the upper peripheries of the conveyer rollers whereby, as the rollers are carried up the incline, they are caused to rotate backwardly with respect to their direction of travel. Such construction, known to the art as the reverse cross roller elevator, has the well known effect in operation of preventing any pieces of fruit from being carried along on the tops of the rollers intermediate the rows of fruit resting between the rollers, so that regardless of the arrangement of the fruit as it is delivered to the conveyer it is automatically distributed into the valleys between the rollers where it is carried along in successive spaced rows.

The discharge end of the conveyer 1 is supported by brackets 14 secured to the side rails 6 and provided with bearings 15 which rest in bearings 16 formed on the upper ends of trunnions 17 secured to the upper ends of end standards 18 forming a part of the framework of the machine. The other end of the conveyer may be supported in any suitable manner, not shown. Power for driving the conveyer may be supplied from an electric motor 19 having a built-in gear reduction unit 20 by means of a chain 21 passing around motor sprocket 22 and a sprocket 23 rotatably mounted on the conveyer drive shaft 5, and operatively engageable therewith through the medium of a jaw clutch made up of fixed clutch member 24 formed integral with the sprocket 23, and movable clutch member 25 which is slidably keyed to a sleeve 26 secured to the shaft 5. The jaw teeth 27 of the clutch members are normally held in engagement by means of a spring 28 bearing at one end against clutch member 25 and at the other end against a cap washer 29 secured on a reduced portion of shaft 5 by a nut 30. A chain tightener 31 may be provided to keep the chain 21 taut.

Adjacent the discharge end of the conveyer 1 is a lowering mechanism operative in timed relation to the conveyer to receive the fruit as it is discharged from the conveyer and gently lower it into the boxes to be filled. This lowering mechanism, in the illustrative embodiment, is made up of a pair of vertically suspended twin lowering conveyers 31, which may appropriately be termed lowerators, and which are mounted in side by side slightly spaced relation and adapted to project into a box presented therebeneath for filling so as to lower the fruit into the box and gently deposit it in the bottom thereof without dropping or otherwise abusing the fruit. It may be stated that the purpose in providing two lowerators, rather than but one, is to enable them to project into boxes of the type in which citrus fruit is packed, which, as is well known, are commonly provided with a central partition. It will be understood, of course, that only a single lowerator need be employed where it is desired to fill other types of boxes or receptacles which are not provided with partitions.

As the fruit is conveyed toward the lowerators 31 on the conveyer 1 it is divided into two streams, each of which is directed to one of the lowerators. This is accomplished by means including a narrow flat faced belt 32 extending lengthwise of the conveyer midway of its width. The belt 32 loosely encircles the entire conveyer and is caused to travel in the direction of the conveyer by the frictional engagement of its upper lap with the conveyer rollers 2 on which the belt rests. The lower lap of the belt may be supported by one or more cross pieces 33 secured to the side rails 6 and suitably recessed to receive and guide the belt.

The separating effect of the belt 32 is due to the fact that, being flat faced, it cannot carry fruit up the inclined portion of the conveyer 1. Consequently, any fruit which may be resting on the belt when it reaches the bottom of the incline will roll back until such time as it is jostled off to one side or the other of the belt by other fruit. The result is that the fruit is separated into two streams on opposite sides of the belt. To positively guide the streams of fruit as they are discharged from the conveyer 1 and prevent any pieces from falling into the space between the lowerators, a guide 34 is provided which extends back a short distance from the discharge end of the conveyer and is carried by a cross piece 35 secured to the side rails 6.

Figure 5:
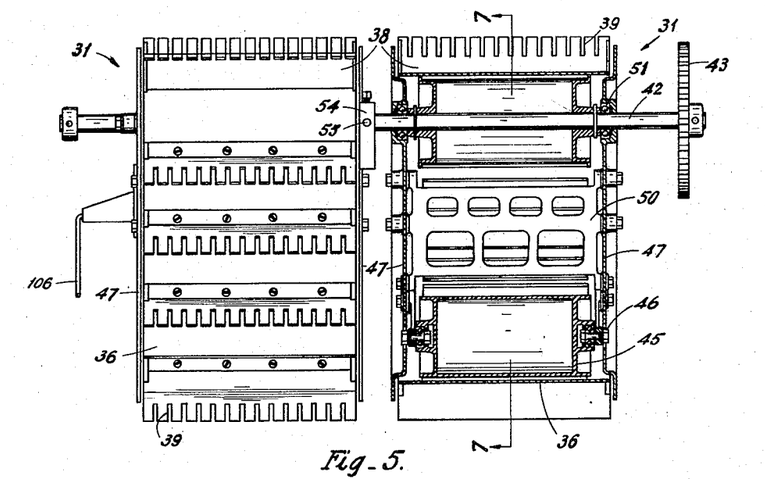
Figure 5 is a side elevation, partly in section, of the twin lowerators forming the lowering mechanism.
Figure 6:
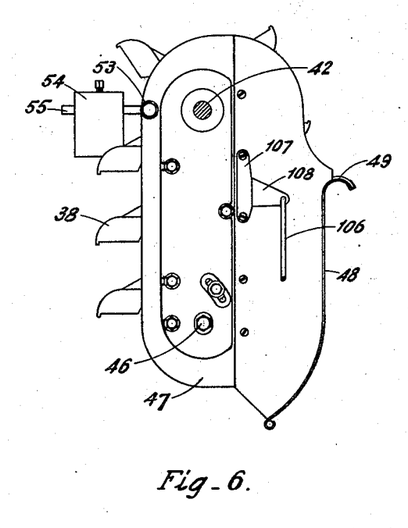
Figure 6 is a side elevation of one of the lowerators as viewed from the right of Figure 5.
Figure 7:
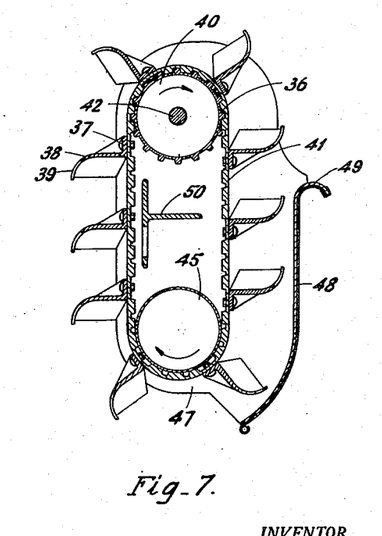
Figure 7 is a sectional view taken along the line 7—7 of Figure 5.

The construction of the lowerators is best shown in Figures 5 to 7, and as they are identical in construction a description of one will suffice for both. Each lowerator includes an endless belt 36 having secured thereto, as by bolts 37, a plurality of trough like flights or buckets 38 for the reception of the rows of fruit as they are discharged from the conveyer 1. The buckets 38 are preferably formed of rubber, leather, or other resilient material strong enough to support the fruit but sufficiently flexible so as to permit them to lightly drag over fruit accumulated in a box therebeneath without damage to the fruit. The outer edges of the buckets may be slotted as at 39 to increase their flexibility at this point.

The lowerator belts 36 are driven by drum gears 40 around which the upper portions of the belts are trained and to which gears the belts are positively geared by means of transverse grooves 41 cut across their rear faces for driving engagement with the gear teeth. The drum gears are pinned to a common drive shaft 42 journalled at its outer ends in the bearings 15 carried by the brackets 14, and are driven in timed relation to the conveyer 1 by intermeshing gears 43 and 44 secured to the shafts 42 and 5, respectively, so that as each row of fruit is discharged from the conveyer one of the lowerator buckets is brought into position just beneath the fruit whereby the latter rolls gently off the conveyer into the bucket.

The lower portions of the lowerator belts 36 are trained around idler drums 45 which are rotatably journalled on pins 46 projecting inwardly from side plates 47, which shield the lowerator belts and are extended rearwardly to house the descending series of buckets 38 so as to prevent any fruit from rolling endwise out of the buckets. A guard plate 48 is secured to the rear edges of the side plates 47 and also serves the purpose of retaining the fruit in the buckets in the event any pieces should happen to pile on top of each other when discharged from the conveyer 1. The guard plate may be provided with a curved upper lip 49 so as to prevent injury to any fruit which might happen to protrude from the edges of the buckets.

The lowerator side plates 47 are rigidly secured together by braces or struts 50, and it is to be noted that these plates are loosely journalled on the drive shaft 42 by means of ball bearings 51 which permit swinging of the lowerators about this shaft for a purpose which will shortly become more apparent. Swinging movement of the lowerators is limited, however, so that they will not strike against the sides of the boxes into which they project, by means of adjustable stops 52 carried by extensions of the trunnions 17 in the path of rubber bumpers 53 projecting outwardly from the outer side plates.

In order to compensate for the unbalanced weight of the rearwardly projecting portions of the side plates which house the descending series of buckets, and cause the lowerators to hang in normally vertical position, balance weights 54 are adjustably mounted on scale beams 55 carried by the side plates 47.

The boxes to be filled with fruit are elevated into filling position beneath the lowerators by means of a hydraulically actuated box supporting table 56 movable up and down between the end standards 18 and guided by means of rollers 57 secured to the underside of the table and running in channel tracks 58 extending vertically along the inner faces of the end standards.

Box guides 59 are secured to opposite sides of a rectangular frame 60 fixed to the end standards 18 and serve to guide the boxes as they are elevated beneath the lowerators and brace them during the filling operation. A flexible apron 61, depending from the frame 60, serves to prevent the travelling lowerator buckets from brushing any pieces of fruit from the surface of the accumulated fruit in the box as the latter becomes filled and is lowered away from the lowerators.

The box supporting table 56 is carried on the upper end of a hollow plunger rod 62 having a piston 63 on its lower end which operates in a plunger cylinder 64 extending centrally into a liquid reservoir 65, and having inlet and escape ports 66 and 67 respectively, the latter of which is controlled by a reciprocating balanced valve 68. The cylinder 64 is open to the atmosphere at its upper end, and a tube 69, communicating with the reservoir 65, extends upwardly beyond the open end of the cylinder and serves to return to the reservoir any liquid which may pass to the rear of the piston 63 and be lifted up to overflow the open cylinder end.

For elevating the table 56 to present a box thereon into filling position beneath the lowerators, a liquid pump 70 is provided which is driven from the motor 19 by means of a belt 71 trained around a pulley 72 secured to the armature shaft 73 of the motor and a second pulley 74 secured to the pump shaft 75. The pump 70 draws its supply through an inlet pipe 76 communicating with the interior of the reservoir 65 in which a supply of liquid, such as oil for example, is maintained, and the discharge of the pump is received by a pipe 77.

A branch pipe 78 extending from the pipe 77 connects the discharge of the pump 70 with the inlet port 66 in the head end of the plunger cylinder 64, whereby to admit liquid under pressure beneath the piston 63 to elevate the box supporting table 56. The flow of liquid through the pipe 78 is controlled by a normally closed spring actuated valve 79 disposed in a valve housing 80 from which the stem 81 of the valve protrudes for engagement and actuation by an arm 82 carrying a roller 83 and pivotally pinned to the valve housing at 84. The pipe 78 also contains a non-return valve 85.

Figure 10:
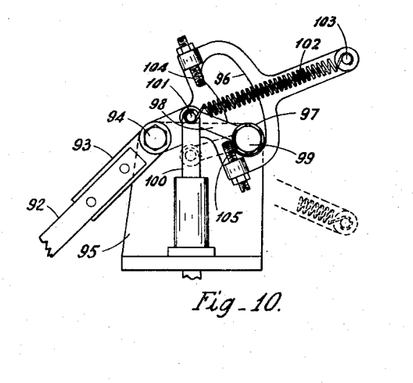
Figure 10 is an enlarged detail of the valve actuating mechanism controlled by the box supporting table.
Figure 11:
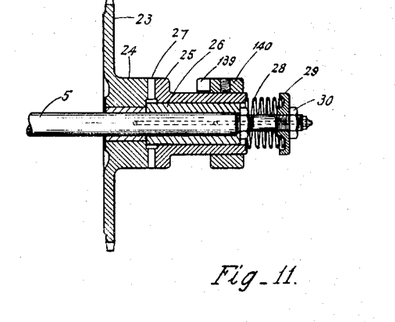
Figure 11 is a sectional view through the driving clutch as viewed along the line 11—11 of Figure 3.

A second branch pipe 86 extends from the pump discharge pipe 77 to a valve housing 87 which discharges through a pipe 88 to the reservoir 65. The flow of liquid through the pipes 86 and 88 is controlled by a valve 89 within the housing 87, and mechanism is provided for opening this valve when the box supporting table 56 is elevated to present an empty box into filling position beneath the lowerators as indicated by the dotted lines in Figure 1, so as to cause the pump to discharge through the pipe 88 into the reservoir 65, thereby arresting further elevation of the table. This is accomplished by means of a valve actuating mechanism, best seen in Figures 1 and 10, which includes parallel links 90 pivotally pinned at their upper ends to the underside of the table 56 at 91 and at their opposite ends to a lever 92 rigidly secured to an arm 93 pivotally pinned at 94 to a supporting bracket 95 mounted on top of the valve housing 87. The arm 93 is provided with an arcuate slot 96 for the reception of a sleeve or hub 97 formed integral with the outer end of a link 98 and rotatably journalled on a pin 99 projecting from the bracket 95. The link 98 is pivotally secured to the upper end of the stem 100 of the valve 89 by a pin 101, and a spring 102 is secured at one end to the pin 101 and at the other end to a second pin 103 carried by a rearward extension of the arm 93.

By the construction just described it will be observed that as the table 56 is elevated the arm 93 is turned about its pivot 94 until, as the table reaches its elevated position as indicated by the dotted lines in Figure 1, the axis of the spring 102 passes sufficiently below the center line of the link 98 to pull the valve stem 100 downwardly, thereby opening the valve 89 so as to permit the pump to discharge through the pipes 86 and 88 into the reservoir 65. Contrawise, when the box supporting table has been lowered to the position shown in full lines in Figure 1, the arm 93 is turned in the opposite direction until the spring 102 passes over the center line of the link 98 and lifts the valve stem 100 so as to prevent the pump from discharging into the reservoir through the pipes 86 and 88 and direct the liquid from the pump to the pipe 78. The spring 102 is assisted in lifting and lowering the valve stem 100 by means of adjustable screws 104 and 105 carried by the arm 93 which engage with the link 98 as the bracket reaches its extreme positions and positively lifts or lowers the link 98 according to which of the screws engage therewith.

The elevation of the box supporting table 56 into the position indicated by the dotted lines in Figure 1 causes the lower ends of the lowerators to project into the box presented therebeneath so as to just clear the bottom of the box, whereby the fruit is gently rolled out of the lowerator buckets into the box without being dropped, and spreads out over the bottom of the box under the action of the tips of the lowerator buckets lightly brushing thereover. It will be apparent, however, that as fruit continues to be deposited in the box a relative recession must take place between the lowerators and the box if the latter is to be filled, and it is desirable that such action be carefully controlled throughout the filling operation since, on the one hand, the level of accumulating fruit should be maintained in closely adjacent relation to the discharge ends of the lowerators, whereby the fruit will not be allowed to fall any material distance as it is discharged from the lowerators, while on the other hand it is necessary to prevent the accumulating fruit from piling up against the lowerators with sufficient force to scuff, squeeze or otherwise injure it. Accordingly, suitable mechanism is provided for progressively lowering the box supporting table during the filling operation at a rate substantially corresponding to the rate of fill, thereby maintaining the desired relation between the lowerators and the level of accumulating fruit.

As previously noted, the lowerators are free to swing within the limits set by the stops 52 so that as the accumulating fruit piles up against the traveling lowerator buckets it will be observed that the resulting increase in the tractional effect of the lowerator buckets, as they sweep over the fruit, will cause the lowerators to swing or "walk" toward the right, as viewed in Figure 1, out of their normally vertical position. Such swinging movement assists in spreading the fruit evenly across the box and is also utilized to lower the box supporting table 56 a limited amount by momentarily lifting the valve 68 to allow the escape of a portion of liquid from beneath the pistons 63 into the reservoir 65.

This is accomplished by means including a pair of rods 106 which are pivotally hooked into arms 107 projecting from brackets 108 secured to the outside lowerator side plates. The rods 106 are connected at their lower ends by means of slip joints to arms 109 secured to the outer ends of a shaft 110 which extends transversely of the machine and is rotatably journalled in bearings 111 secured to the undersides of side rails 112 forming a part of the framework of the machine. Secured to the shaft 110 intermediate its length is a crank arm 113, the outer end of which is pivotally secured between the bifurcated end of a rod 114 extending downwardly into the reservoir 65 and connected with the valve 68.

Figure 12:
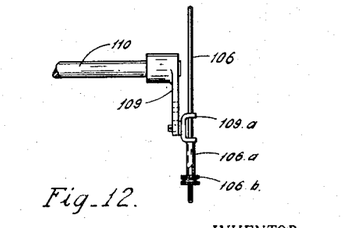
Figure 12 is an enlarged detail of one of the slip joints employed in the actuating mechanism interconnecting the lowerators with the escape valve which controls the operation of the box supporting table.

The slip joint connections between the rods 106 and arms 109, as best seen in Figure 12, include bifurcated bearings 109a pivotally secured to the ends of the arms 109. The rods 106 slidably extend through the bearings 109a and carry spacer sleeves 106a adjacent their lower ends which are held in place by locking nuts 106b. As will be apparent, these slip joints permit actuation of the shaft 110 by swinging movement of either of the lowerators independently of the other.

Through the actuating mechanism just described it will be apparent that each time the accumulating fruit engages with the lowerator buckets 38 to cause either or both of the lowerators to swing, one or both of the rods 106 are lifted upwardly and thereby rotate the shaft 110 and lift the valve 68 so as to allow the escape of liquid from beneath the piston 63 into the reservoir 65. The box supporting table is thus caused to descend, whereupon, as the fruit is lowered away from the lowerator buckets, the lowerators swing back into their normally vertical positions, and the resulting downward shifting of the rods 106 releases the arm 109 and allows the valve 68 to descend by gravity to close the escape port 67, thereby preventing further lowering of the box supporting table 56 until the lowerators are again caused to swing by engagement with the accumulating fruit.

Thus it will be seen that the lowerators serve the dual purpose of delivering fruit into the boxes and simultaneously gauging the level of accumulating fruit to cause the box supporting table to be progressively lowered during the filling operation at a rate substantially corresponding to the rate of fill whereby to maintain the level of accumulating fruit in closely adjacent relation to the lowerators while preventing the lowerators from exerting any material pressure against the fruit such as might result in injury thereto.

As each box is filled to the desired extent, the delivery of fruit thereto is automatically interrupted by mechanism shortly to be described, and the box supporting table is lowered to set the box down on a transfer table from whence it may be discharged from the machine and replaced with an empty box.

Figure 2:
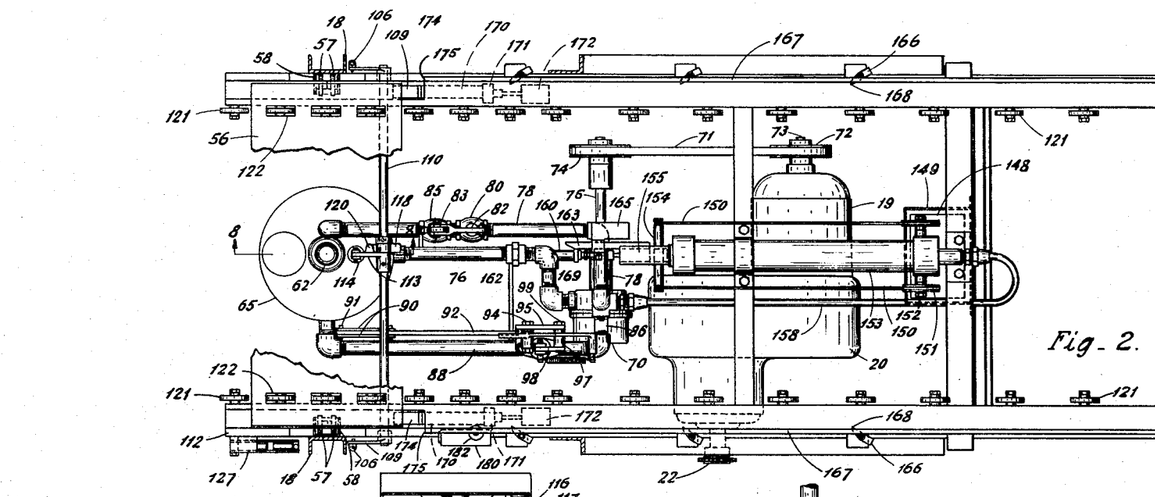
Figure 2 is a sectional plan view taken along the line 2—2 of Figure 1, but with the box feeding table removed and certain parts broken away to better illustrate certain details of construction.
Figure 3:
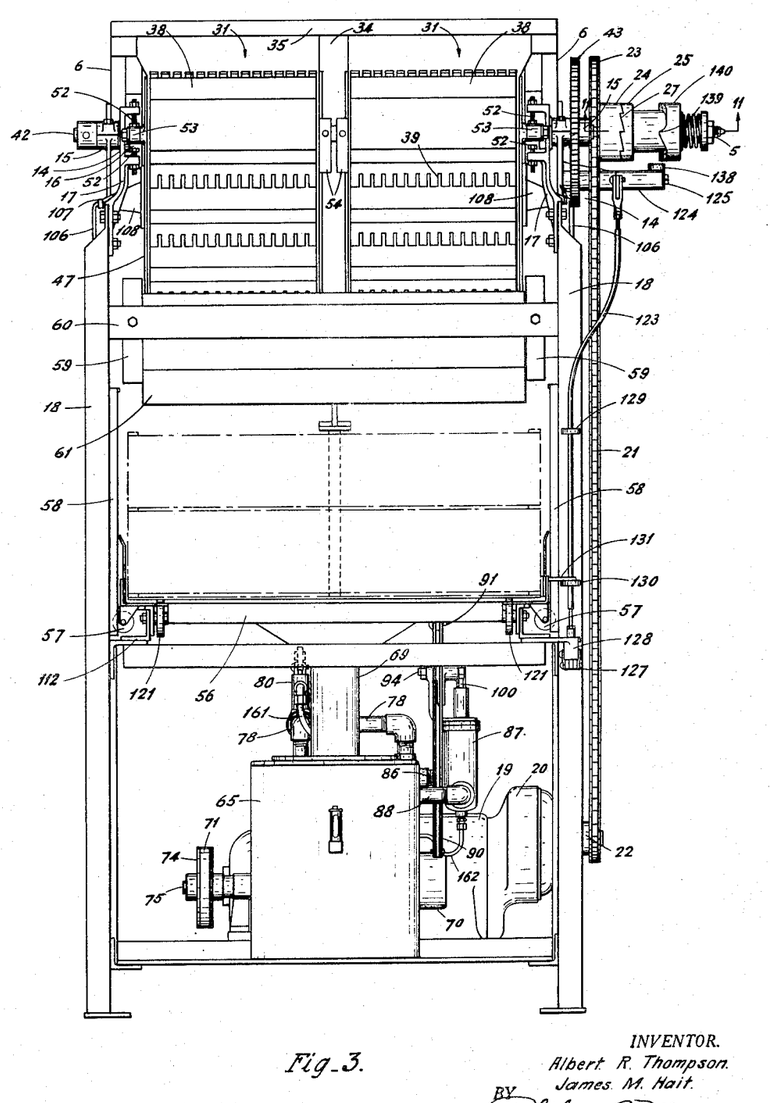
Figure 3 is an end elevation of the machine as viewed from the left of Figure 1.
Figure 8:
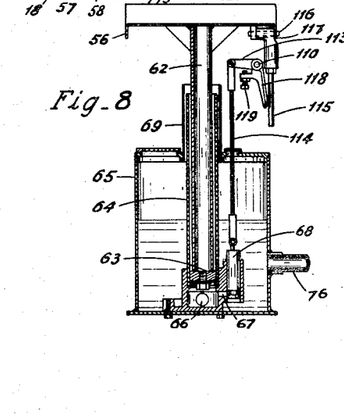
Figure 8 is a sectional view through the box supporting table and its actuating mechanism as viewed along the line 8—8 of Figure 2.
Figure 9:
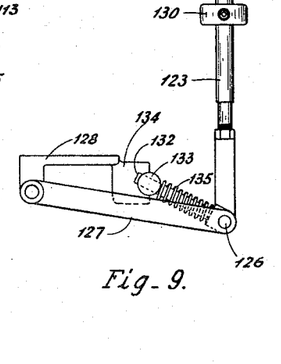
Figure 9 is an enlarged detail of a portion of the clutch control mechanism.

As best seen in Figures 1, 2 and 8, a short rod 115 is pivotally suspended from the underside of the box supporting table by a pin 116 secured to depending ears 117, and an arm 118 is loosely journalled on the shaft 110 directly in the path of the rod. The arm 118 carries an adjustable screw 119 which is engageable with a lug 120 carried by the adjacent crank arm 113 whereby, as the lower end of the rod 115 rides onto the inclined edge of the arm 118, the latter is rocked to carry the screw 119 into engagement with the lug 120 and lift the crank 113. It will be understood that the length of the rod 115 and the adjustment of the screw 119 are such that the crank 113 is lifted just as the box is filled to the desired extent, whereupon the valve 68 is lifted to allow the escape of liquid from beneath the piston 63 and the box supporting table is thus let down onto the side rails 112. The box is deposited on a transfer table formed by rollers 121 which are rotatably secured to said side rails and project upwardly through slots 122 in the table 56. The delivery of fruit is interrupted by means including a rod 123 connected at its upper end to a clutch actuating lever 124 which is pivoted at 125 to one of the brackets 14, and is operable to disconnect the clutch members 24 and 25 whereby to stop both the conveyer 1 and the lowerators. The lower end of the actuating rod 123 is connected by a pin 126 to one end of a link 127 which is pivotally secured at its other end to a bracket 128 attached to the underside of one of the channel iron side rails 112, and spaced collars 129 and 130 are adjustably secured to the rod 123 for engagement with a lug 131 projecting outwardly from the box supporting table 56. Thus, as the box supporting table descends, the lug 131 engages with the lower collar 130 as the filling is completed and pulls the rod 123 downwardly to actuate the clutch lever 124 to disengage the clutch. Likewise, when the table is elevated into its upper position, engagement of the lug with the upper collar 129 lifts the rod 123 to actuate the clutch lever to engage the clutch, whereupon delivery of fruit is resumed.

To provide prompt actuation of the rod 123 when the lug 131 engages with either of the collars 129 and 130, and to positively hold the rod in its extreme upper and lower positions, an auxiliary actuating mechanism is provided, including a pin 132 loosely journalled at one end on the pin 126 which connects the lower end of the rod 123 with the link 127, and slidably projects through a cylindrical bearing 133 journalled in a bearing block 134 formed integral with the bracket 128. A spring 135 surrounds the pin 132 and bears against the bearing 133 so that as the rod 123 is lifted or lowered to carry the axis of the spring 135 to one side or the other of the axis of the link 127 the spring automatically actuates the rod to the full extent of its movement.

Figure 4:
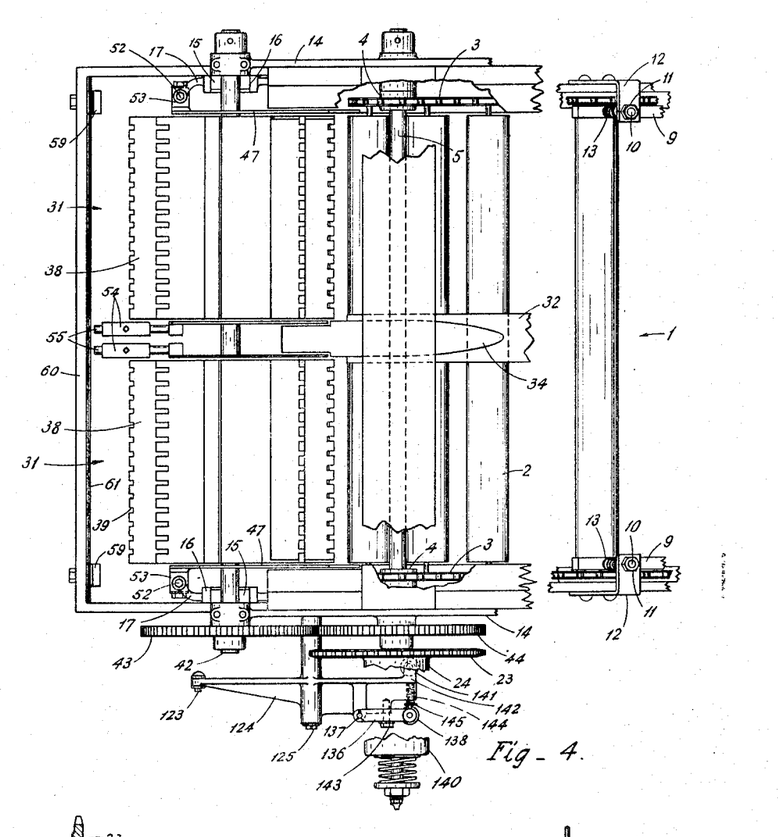
Figure 4 is an enlarged plan view of the lowering mechanism and the discharge end of the adjacent feed conveyor, illustrating details of the clutch mechanism.

The clutch actuating lever 124, as best seen in Figures 1 and 4, carries a bifurcated arm 136 which is pivotally secured to the web of the lever at 137 and carries a roller 138 journalled on its upper face in position to be carried by the lever into and out of the path of the inclined lobes 139 of a four lobed cam 140 adjustably secured to the slidable clutch member 25.

A roller 141 journalled on a lug 142 integral with the lever 124 bears against the face of the sprocket 23 and serves to brace the lever against the force exerted by engagement of the roller 138 with the cam lobes 139 in disengaging the clutch. The arm 136 is normally urged outwardly from the lever 124 towards the cam 140 to the extent permitted by a stop 143 by means of a concealed spring 144 seated in a recess in the web of the lever and bearing against a boss 145 projecting from the end of the arm to one side of the roller 138.

By this construction, when the clutch lever is shifted by downward movement of the rod 123 to carry the roller 138 into the path of the cam lobes 139, the roller 138 is depressed by the cam against the tension of the spring 144 until the boss 145 strikes the web of the clutch lever, or until the spring overcomes the frictional resistance of the clutch members against separation, whereupon the clutch member 25 is caused to slide axially out of engagement with the clutch member 24. The spring 144 is, however, stronger than clutch spring 28, so that as soon as the clutch jaws are disengaged the spring 144 overcomes spring 28 and continues to force the slidable clutch member away from the clutch member 24 to the limit permitted by the stop 143. This action produces a definite clearance between the clutch jaws and prevents the clatter such as commonly occurs in jaw clutches from insufficient clearance between the clutch jaws when disengaged.

When the clutch members 24 and 25 are disconnected to stop the conveyer 1 and the lowerators, it is important that the latter be brought to rest with the lowerator buckets 38 in predetermined position, since if the buckets were permitted to come to rest in any position possible it is probable that not infrequently one of them would have just reached a position where the fruit therein is just balanced on the edge of the bucket ready to discharge. This, of course, is a very unstable position, due in part to the flexiblity of the buckets, and should this fruit happen to drop off the bucket during the transfer of boxes, as it would be likely to do from vibration of the machine resulting either from its own operation or from operations in other parts of the packing house, it might fall into the incoming empty box a distance of over a foot, thereby injuring the fruit.

To prevent this from occurring, the construction of the clutch mechanism is such that as the clutch is disconnected the lowerators are brought to rest with their buckets in predetermined position, wherein none of the buckets are on the verge of discharging their contents. This is readily accomplished by providing the clutch cam 140 with the proper number of lobes 139 to correspond with the number of lowerator buckets which pass any given point per revolution of the drive shaft 5, and by proper angular adjustment of the cam. In the illustrative embodiment, for example, the driving ratio is such that four lowerator buckets pass any given point per revolution of the shaft 5. Accordingly, the cam 140 is provided with four lobes 139, and since both the lowerator buckets and the cam lobes are uniformly spaced it will be apparent that upon disconnection of the clutch by clutch roller 138 the lowerator buckets will always be stopped in predetermined position irrespective of which cam lobe is engaged by the clutch roller. The particular position in which the lowerators are stopped is determined by angular adjustment of the cam 140 about the clutch member 25.

The delivery of boxes to the box supporting table 56 for filling is effected by means of a reciprocatory feed table 146 resting upon the series of rollers 121 and provided with a plurality of steps 147, corresponding in width to the width of the boxes, which serve to support and advance a file of boxes. The feed table is normally held in retracted position, as shown in Figure 1, by means of a weight 148 operable in a guide housing 149 and suspended on ropes 150 trained around pulleys 151 which are rotatably journalled on studs 152 carried by a cylinder 153 supported beneath the feed table. The ends of the ropes 150 remote from the weight 148 are attached to a short rod 154 carried by a U-shaped bracket 155 secured to the underside of the feed table.

The feed table 146 is reciprocated in timed relation to the operation of the box elevating table 56 by means of a piston 156 operating within the cylinder 153 and connected with the bracket 155 by a piston rod 157. A pipe 158 connects the rear end of the cylinder 153 with pump discharge pipe 77 whereby, as the box supporting table 56 descends to its lowermost position and the valve 89 is thereby closed, the discharge from the pump 70 is directed into the cylinder 153 behind the piston 156 and drives the feed table 146 to the left as viewed in Figure 1, so that the file of boxes ejects the filled box from the machine and replaces it with an empty box.

A drain tube 159 tapped into the cylinder 153 serves to drain the cylinder of any liquid forced past the piston 156 and directs it into a pipe 160, which discharges into the reservoir 65. Similar drain tubes 161 and 162 connect the valve housings 80 and 87, respectively, with the pipe 160, the tube 161 serving as an escape for any liquid forced upwardly along the valve stem 81, and the tube 162 acting to drain the valve housing 87 to prevent liquid from accumulating beneath valve 89 and thereby interfering with its operation.

Attached to the bracket 155 carried by feed table 146 is a forwardly projecting bar 163 having an inclined forward edge 164 and carrying a depending finger 165. The positions of the bar 163 and finger 165 are such that as the feed table reaches the end of its feeding stroke, the finger 165 rides over and depresses the roller 83 to open the valve 79, while simultaneously the inclined forward edge of the bar 163 strikes the rod 115 depending from the table 56 and swings said rod out of engagement with the arm 118, allowing the valve 68 to descend by gravity and close the escape orifice of the plunger cylinder 64. With the opening of valve 79 and closing of valve 68 it will be seen that the discharge from the pump 70 is directed through the pipes 77 and 78 into the plunger cylinder 64 beneath the piston 63 to elevate the table 56, carrying the empty box with it into filling position beneath the lowerators. Elevation of the table 56 into this position again opens valve 89 to allow pump 70 to discharge into reservoir 65, thereby bringing the table to rest and at the same time releasing the pressure behind piston 156, whereupon the feed table 146 is returned to its normally retracted position by the weight 148.

The boxes advanced by the forward stroke of the feed table are retained in their advanced positions as the feed table is retracted by means of a series of pawls 166 pivoted in guide rails 167 extending alongside the feed table for guiding the boxes. The pawls 166 are provided with sharpened ends 168, and are actuated by springs 169 which permit the pawls to yield and allow the boxes to advance therepast, but which cause the sharpened ends of the pawls to dig into the ends of the boxes as the feed table is retracted and thereby prevent retraction of the boxes.

To prevent accidental advancement of the file of boxes during operative periods of the table 146, a pair of arms 170 are pivotally secured to brackets 171 carried by the side rails 167. The arms 170 carry weights 172 on their rear ends and are provided with hooked forward portions 173 having horizontally extending lips 174. The upper flanges of the side rails 112 are cut away as at 175 to permit the hooked ends of the arms to be elevated into the path of the boxes where they are normally held by the weights 172 so as to prevent the boxes from being moved into the path of the table 56. The lips 174, however, are engageable by the table 56 as the latter arrives at the terminus of its descent, whereby the arm 170 is depressed out of the path of the file of boxes leaving them free to be advanced by the feed table 146.

A heavy arm 176, pivoted at its upper end to a bracket 177, is suspended above the box feed table 146 by a chain 178 and has a curved runner 179 at its lower end in position to ride over the upper edges of the partitions in the boxes as the latter are delivered to the table 56. The weight of the arm 176 bearing upon the boxes serves to counteract any tendency of the boxes to tip forwardly and catch their lower forward edges against the table 56 as they are pushed onto the table.

A "no box no fill" mechanism is provided including an electric switch 180 secured to one of the box guides 167 and interposed in the supply circuit 181 of the motor 19. The switch 180 has an arm 182 projecting through an aperture 183 in the guide rail 167 for engagement with the passing boxes to keep the switch closed. If at any time a box does not come into position for transfer to the table 56 when the latter descends into position for the reception of another box, the switch 180 opens and thereby stops the motor 19 so as to shut down the machine until a box is placed in position for transfer to the table 56 to receive the fruit from the lowerators.

Operation

In operation, assuming, to begin with, that the parts are in the positions illustrated in Figure 1, it will be seen that the box table 56 has just descended to deposit a filled box on the rollers 121. At this point in the cycle of operations the clutch members 24 and 25 are open so that the conveyer 1 and lowerators 31 are idle, and the valves 79 and 89 are closed, thereby directing the discharge from the pump 70 through the pipe 158 to cylinder 153. The feed table 146 is thus driven to the left, causing the file of boxes to eject the filled box from the machine and replace it with an empty box. Simultaneously, as the feed table 146 reaches the end of its feed stroke, the finger 165 rides over and depresses the roller 83 to open the valve 79, and the bar 163 strikes the rod 115 depending from the table 56 thus swinging said rod out of engagement with the arm 118 and allowing the valve 68 to descend by gravity to close the escape orifice of the plunger cylinder 64.

With the opening of the valve 79 and closing of valve 68 the discharge of the pump 70 is directed through the pipes 77 and 78 into the plunger cylinder 64 beneath the piston 63, thereby elevating the table 56. As the table is elevated the link 90 is thereby lifted to rock the arm 93 until the box is elevated into filling position as indicated by the dotted lines in Figure 1, whereupon the spring 102 quickly opens the valve 89 to cause the pump 70 to discharge through pipes 77 and 88 into the reservoir 65. The consequent release of pressure on the pistons 63 and 156 brings the table 56 to rest and permits the weight 148 to return the feed table 146 to its normally retracted position. The file of boxes advanced by the feed stroke of the table 146 are retained in their advanced positions by the pawls 166 and an additional box is delivered to the now empty upper step of the feed table, either manually or by any suitable feed mechanism.

Simultaneously, as the table 56 elevates the empty box into filling position beneath the lowerators 31, the lug 131 is lifted by the table into engagement with the upper collar 129 on the rod 123, thereby lifting said rod and rocking the clutch lever 124 to lower the clutch roller 138 out of engagement with the cam 140, whereupon the clutch members 24 and 25 are forced into engagement by clutch spring 28 and the conveyer 1 and lowerators 31 begin to operate to deliver fruit into the box presented thereto.

It will be observed that the empty box is initially elevated to bring its bottom closely beneath the travelling lowerator buckets, which flex slightly in discharging the fruit and roll it gently onto the bottom of the box, where it is spread across the box by the action of the lowerator buckets lightly brushing over it. As the fruit continues to accumulate in the box the traction of the lowerator buckets thereon increases until either or both of the lowerators are caused to swing or "walk" to the right as viewed in Figure 1, whereupon one or both of the rods 106 are lifted to rock the shaft 110 and lift the valve 68, thereby releasing liquid from beneath the piston 63. The table 56 is thus allowed to descend to lower the level of accumulating fruit until the decreasing traction between the fruit and the lowerators allows the latter to swing back into their normally vertical position, whereupon the valve 68 closes again to bring the table 56 to rest until the lowerators again swing out of their normal position.

From the foregoing it will be apparent that as the fruit accumulates in the box during the filling operation, the lowerators are repeatedly swung back and forth, thereby assisting in spreading the fruit evenly across the box and at the same time progressively lowering the box supporting table 56 correspondingly to the increasing depth of accumulating fruit. Thus the box is caused to descend at a rate corresponding to the rate of fill to maintain the level of accumulating fruit substantially constant and closely beneath the lowerators, whereby the fruit is not dropped in being discharged from the lowerators nor is it permitted to bear against the lowerators with sufficient force to cause any injury to it.

The continued descent of the box supporting table 56 as the filling progresses brings the lug 131 into engagement with the lower collar 130 on the rod 123 to pull said rod downwardly as the box becomes filled to the desired extent. The clutch lever 124 is thereby actuated to lift the clutch roller 138 into the path of the lobes 139 on the cam 140 to disengage clutch members 24 and 25, whereupon the conveyer 1 and the lowerators are stopped and the delivery of fruit to the box ceases.

Simultaneously with disengagement of the clutch members 24 and 25, the rod 115 which depends from the underside of the table 56 rides over the inclined edge of the arm 118 thereby rocking the shaft 110 to lift valve 68 and allow the table to descend to its lowermost position, where it comes to rest on the side rails 112 and deposits the filled box on the rollers 121. At the same time the arm 93 is rocked by the lowering of the link 90 and arm 92 to close the valve 89, whereupon the box feed table 146 is again actuated and the cycle of operations described is repeated.

It will be understood that while we have disclosed the invention as it may be embodied in apparatus for filling fruit, such as lemons, into boxes, it is not necessarily confined thereto, but may be utilized to fill various other articles into receptacles of various kinds, and the terms "fruit" and "box" as used herein are intended to be inclusive of such other articles and receptacles. Moreover, as will be apparent, numerous variations and modifications may be resorted to without departing from the spirit or scope of the invention, and we deem ourselves entitled to all such uses, variations and modifications as fall within the spirit and scope of the claims hereto appended.

Having now described our invention and in what manner the same may be used, what we claim as new and desire to protect by Letters Patent is:

1. In a box filling machine, a box support, a vertically disposed endless conveyer mounted above said support and adapted to project into a box supported therebeneath, means for operating said conveyer to lower articles into said box, means for elevating and lowering said box support, and means controlled by the rising level of articles accumulating in said box for controlling the descent of said box support.

2. In a box filling machine, a box support, a vertically disposed endless conveyer mounted above said support and adapted to project into a box supported therebeneath, means for operating said conveyer to lower articles into said box, means for elevating and lowering said box support, and means operable in timed relation to said box support for delivering boxes to be filled thereto.

3. In a box filling machine, a box support, a vertically disposed endless conveyer mounted above said support and adapted to project into a box supported therebeneath, said conveyer being provided with article conveying flights, means for operating said conveyer to lower articles into said box, means for elevating and lowering said box support, means operable in timed relation to said conveyer flights for feeding articles thereto, and means operable in timed relation to said box support for delivering boxes to be filled thereto.

4. In a box filling machine, a vertically disposed endless conveyer adapted to project into a box positioned therebeneath for filling, means for supporting a box in filling position beneath said conveyer, article conveying flights on said conveyer, said flights being flexible to permit them to brush gently over articles accumulating in said box therebeneath, means for operating said conveyer to lower articles into said box, and means providing for relative receding movement between said conveyer and box supporting means during the filling operation.

5. In a box filling machine, a vertically disposed endless conveyer adapted to project into a box positioned therebeneath for filling, means for supporting a box in filling position beneath said conveyer, means mounting said conveyer for swinging movement laterally of said box by tractive engagement with articles accumulating in said box therebeneath, means for operating said conveyer to lower articles into said box, and means providing for relative receding movement between said conveyer and box supporting means during the filling operation.

6. In a box filling machine, a vertically disposed endless conveyer adapted to project into a box positioned therebeneath for filling, means for supporting a box in filling position beneath said conveyer, article conveying flights on said conveyer, said flights being flexible to permit them to brush gently over articles accumulating in said box therebeneath, means mounting said conveyer for swinging movement laterally of said box by tractive engagement of said flights with articles in said box, means for operating said conveyer to lower articles into said box, and means providing for relative receding movement between said conveyer and box supporting means during the filling operation.

7. In a box filling machine, a box support, a vertically disposed endless conveyer mounted above said support and adapted to project into a box supported therebeneath, means for operating said conveyer to lower articles into said box, means for elevating and lowering said box support, and means controlling the descent of said box support in accordance with the rate of fill.

8. In a box filling machine, a vertically disposed endless conveyer adapted to project into a box positioned therebeneath for filling, a box support operable to elevate a box into filling position beneath said conveyer, means for operating said conveyer to lower articles into said box, and means responsive to the increasing depth of articles accumulating in said box for correspondingly lowering said box support during the filling operation to maintain the level of accumulating articles closely beneath said conveyer.

9. In a box filling machine, a vertically disposed endless conveyer adapted to project into a box positioned therebeneath for filling, said conveyer being provided with flexible article conveying flights, a box support operable to elevate a box into filling position beneath said conveyer, means for operating said conveyer to lower articles into said box, and means for progressively lowering said box support during the filling operation in such manner as to maintain the level of accumulating articles closely beneath said conveyer and permit said conveyer flights to brush lightly over the accumulating articles to spread the latter across the box.

10. In a box filling machine, a vertically disposed endless conveyer adapted to project into a box positioned therebeneath for filling, a box support operable to elevate a box into filling position beneath said conveyer, means for operating said conveyer to lower articles into said box, and means responsive to the increasing depth of articles accumulating in said box for intermittently lowering said box support by limited stages such as to maintain the level of accumulating articles closely beneath said conveyer during the filling operaton.

11. In a box filling machine, a box support, a vertically disposed endless conveyer mounted above said support and adapted to project into a box positioned therebeneath for filling, means actuated by a pressure fluid for elevating said box support to raise a box into filling position beneath said conveyer, means for operating said conveyer to lower articles into said box, and means responsive to the increasing depth of articles accumulating in said box for intermittently releasing said pressure fluid to repeatedly lower said box support by limited stages such as to maintain the level of accumulating articles closely beneath said conveyer, during the filling operation.

12. In a box filling machine, a vertically disposed endless conveyer adapted to project into a box positioned therebeneath for filling, a box support operable to elevate a box into filling position beneath said conveyer, means for operating said conveyer to lower articles into said box, means responsive to the increasing depth of articles accumulating in said box for correspondingly lowering said box support to maintain the level of accumulating articles closely beneath said conveyer during the filling operation, and means operable in timed relation to said box support for delivering boxes to be filled thereto.

13. In a box filling machine, a vertically disposed endless conveyer adapted to project into a box positioned therebeneath for filling, said conveyer being provided with article conveying flights, a box support operable to elevate a box into filling position beneath said conveyer, means for operating said conveyer to lower articles into said box, means operable in timed relation to said conveyer flights for delivering articles thereto, means responsive to the increasing depth of articles accumulating in said box for correspondingly lowering said box support to maintain the level of accumulating articles closely beneath said conveyer during the filling operation, and means operable in timed relation to said box support for delivering boxes to be filled thereto.

14. In a box filling machine, a vertically disposed endless conveyer adapted to project into a box positioned therebeneath for filling, a box support operable to elevate a box into filling position beneath said conveyer, means for operating said conveyer to lower articles into said box, means mounting said conveyer for swinging movement from side to side of said box by tractive engagement with articles accumulating in said box therebeneath, and means responsive to the increasing depth of articles accumulating in said box for correspondingly lowering said box support to maintain the level of accumulating articles closely beneath said conveyer during the filling operation.

15. In a box filling machine, a vertically disposed endless conveyer adapted to project into a box positioned therebeneath for filling, a box support operable to elevate a box into filling position beneath said conveyer, article conveying flights carried by said conveyer, said flights being flexible to permit them to brush lightly over articles accumulating in said box, means for operating said conveyer to lower articles into said box, and means responsive to the increasing depth of articles accumulating in said box for correspondingly lowering said box support to maintain the level of accumulating articles closely beneath said conveyer during the filling operation.

16. In a box filling machine, a vertically disposed endless conveyer adapted to project into a box positioned therebeneath for filling, a box support operable to elevate a box into filling position beneath said conveyer, article conveying flights carried by said conveyer, said flights being flexible to permit them to brush lightly over articles accumulating in said box therebeneath, means for operating said conveyer to lower articles into said box, means mounting said conveyer for swinging movement from side to side of said box by tractive engagement of said flights with articles accumulating in said box, and means responsive to the increasing depth of articles accumulating in said box for correspondingly lowering said box support to maintain the level of accumulating articles closely beneath said conveyer during the filling operation.

17. In a box filling machine, a vertically disposed endless conveyer adapted to project into a box positioned therebeneath for filling, a box support operable to elevate a box into filling position beneath said conveyer, means for operating said conveyer to lower articles into said box, and means responsive to engagement between said conveyer and articles accumulating in the box therebeneath for progressively lowering said box support, to maintain the level of accumulating articles closely beneath said conveyer during the filling operation.

18. In a box filling machine, a vertically disposed endless conveyer adapted to project into a box positioned therebeneath for filling, said conveyer being movably mounted to permit the same to be shifted out of its normal position by engagement with articles accumulating in a box therebeneath, a box support operable to elevate a box into filling position beneath said conveyer, means for operating said conveyer to lower articles into said box, and means responsive to movement of said conveyer out of its normal position for progressively lowering said box support during the filling operation to maintain the level of accumulating articles closely beneath said conveyer.

19. In a box filling machine, a vertically disposed endless conveyer adapted to project into a box positioned therebeneath for filling, said conveyer being mounted to swing out of its normal position by tractive engagement with articles accumulating in a box therebeneath, a box support operable to elevate a box into filling position beneath said conveyer, means for operating said conveyer to lower articles into said box, and means responsive to swinging of said conveyer out of its normal position for progressively lowering said box support during the filling operation to maintain the level of accumulating articles closely beneath said conveyer.

20. In a box filling machine, a vertically disposed endless conveyer adapted to project into a box positioned therebeneath for filling, said conveyer being provided with a plurality of flexible article conveying flights and being pivotally suspended to permit it to swing out of its normal position by tractive engagement of said flights with articles accumulating in a box therebeneath, a box support operable to elevate a box into filling position beneath said conveyer, means for operating said conveyer to lower articles into said box, means operable in timed relation to said conveyer flights for delivering articles thereto, means responsive to swinging of said conveyer out of its normal position for progressively lowering said box support during the filling operation to maintain the level of accumulating articles closely beneath said conveyer, and means operable in timed relation to said box support for delivering boxes to be filled thereto.

21. In a box filling machine, a vertically disposed endless conveyer adapted to project into a box positioned therebeneath for filling, a box support operable to elevate a box into filling position beneath said conveyer, means for feeding articles to said conveyer, means for operating said conveyer to lower said articles into said box, means for progressively lowering said box support during the filling operation to maintain the level of accumulating articles closely beneath said conveyer, and means operable to cut off the feed of articles to said conveyer when a box therebeneath is filled.

22. In a box filling machine, a vertically disposed endless conveyer adapted to project into a box positioned therebeneath for filling, a box support operable to elevate a box into filling position beneath said conveyer, means for feeding articles to said conveyer, means for operating said conveyer to lower said articles into said box, means for progressively lowering said box support during the filling operation to maintain the level of accumulating articles closely beneath said conveyer, and means operable in response to a predetermined lowering of said box support to interrupt the feed of articles to said conveyer.

23. In a box filling machine, a vertically disposed endless conveyer adapted to project into a box positioned therebeneath for filling, a box support operable to elevate a box into filling position beneath said conveyer, means for driving said conveyer to lower articles into said box, means for actuating said conveyer drive to bring the conveyer into operation when said box support is elevated into filling position, means responsive to the increasing depth of articles accumulating in said box for correspondingly lowering said box support to maintain the level of accumulating articles closely beneath said conveyer during the filling operation, and means for actuating said conveyer drive to stop the conveyer when said box support descends to a predetermined level.

24. In a box filling machine, an endless conveyer for lowering articles into a box positioned therebeneath, said conveyer being provided with a plurality of article conveying flights, means for delivering articles to said flights, means for driving said conveyer, means for presenting boxes into filling position beneath said conveyer, and means for disconnecting said conveyer drive means when the box therebeneath is filled to automatically stop said conveyer with the flights thereof in predetermined position.

25. In a box filling machine, a box elevator, actuating means therefor, a driven conveyer for lowering articles into a box on said elevator, and means responsive to engagement between said conveyer and articles accumulating in the box therebeneath for controlling the descent of said elevator.

26. In a box filling machine, a box elevator, elevating means therefor, a driven conveyer provided with flexible article conveying flights for lowering articles into a box on said elevator, and means responsive to tractive engagement between said flights and articles accumulating in the box therebeneath for controllably lowering said elevator at such rate as to maintain the level of accumulating articles in closely subjacent relation beneath said conveyer during the filling operation.

27. In a box filling machine, a box elevator, elevating means therefor, a driven conveyer for lowering articles into a box on said elevator, said conveyer being displaceable by engagement with articles accumulating in a box therebeneath, and means responsive to displacement of said conveyer for controllably lowering said elevator at such rate as to maintain the level of accumulating articles in closely subjacent relation beneath said conveyer during the filling operation.

28. In a box filling machine, a driven conveyer for lowering articles into a box positioned therebeneath for filling, a box elevator disposed beneath said conveyer, means for delivering boxes to said elevator, means responsive to a predetermined lowering of said elevator for actuating said box delivery means, and means responsive to the delivery of a box to said elevator for returning the latter into elevated position.

29. In a box filling machine, a driven conveyer for lowering articles into a box positioned therebeneath for filling, a box elevator disposed beneath said conveyer, actuating means therefor, means responsive to a predetermined elevation of said elevator to initiate operation of said conveyer, means responsive to engagement of said conveyer with articles accumulating in a box on said elevator for controlling the descent of the elevator, means for delivering boxes to said elevator, means respectively responsive to a predetermined lowering of said elevator for arresting operation of said conveyer, and actuating said box delivery means, and means responsive to delivery of a box to said elevator for returning the latter into elevated position.

30. In an apparatus for controlling the level of articles accumulating in a receptacle, elevating means for supporting the receptacle, a movably mounted conveyer disposed above said elevating means and positioned to project into the receptacle to distribute articles onto the bottom thereof, and means controlled by movement of said conveyer in response to the rising level of articles accumulating in said receptacle for determining operation of said elevating means to lower said receptacle and thereby maintain the level of accumulating articles closely beneath said conveyer.

31. An apparatus for feeding articles to a receptacle and controlling the level of articles accumulating in the receptacle, comprising means for supporting the receptacle, feeding means mounted to extend into the receptacle to deposit articles therein and for movement in response to engagement with deposited articles, means for adjusting said supporting means vertically, and means controlled by said feeding means for determining operation of said adjusting means to adjust said supporting means to maintain the level of deposited articles substantially constant.

32. An apparatus for feeding articles to a receptacle and controlling the level of articles fed thereto, comprising elevating means for supporting the bottom of the receptacle, means for feeding articles to the receptacle, and engageable with articles in the receptacle, and means controlled by said feeding means in response to engagement thereof with articles in said receptacle for operating said elevating means.

33. An apparatus for controlling the level of bulk fruit or the like accumulating in a fruit retaining receptacle into which said fruit is deposited in indiscriminately positioned relation, comprising elevating means for supporting the bottom of said receptacle, and fruit engaging means operatively associated with said elevating means and arranged to project into said receptacle above the fruit accumulating therein for engagement with the upper surfaces of said fruit, said fruit engaging means being operable by such engagement to progressively lower said elevating means in accordance with the increasing depth of fruit accumulating in said receptacle whereby to maintain the level of accumulating fruit substantially constant.

34. An apparatus for controlling the level of bulk fruit or the like accumulating in a fruit retaining receptacle into which said fruit is deposited in indiscriminately positioned relation, comprising elevating means for supporting the bottom of said receptacle, and fruit engaging means operatively associated with said elevating means and arranged to project into said receptacle above the fruit accumulating therein for engagement with the upper surfaces of said fruit, said fruit engaging means being flexible to avoid injury to the fruit by such engagement and being operable by such engagement to progressively lower said elevating means in accordance with the increasing depth of fruit accumulating in said receptacle whereby to maintain the level of accumulating fruit substantially constant.

35. The method of filling a fruit retaining receptacle with bulk fruit or the like, comprising the steps of feeding the fruit into said receptacle to cause the fruit to gradually accumulate therein in indiscriminately positioned relation, gauging the level of the fruit during its accumulation in the receptacle by contacting the upper surfaces of the accumulating fruit, and progressively lowering the receptacle bottom in accordance with the increasing depth of the accumulating fruit as determined by the gauging operation, whereby to maintain the level of accumulating fruit substantially constant.

36. The method of filling a fruit retaining receptacle with bulk fruit or the like, comprising the steps of feeding the fruit into said receptacle to cause the fruit to gradually accumulate therein in indiscriminately positioned relation, gauging the level of the fruit during its accumulation in the receptacle by contacting the upper surfaces of the accumulating fruit at a plurality of points over the area of the receptacle, and progressively lowering the receptacle bottom in accordance with the increasing depth of the accumulating fruit as determined by the gauging operation, whereby to maintain the level of accumulating fruit substantially constant.

ALBERT R. THOMPSON.
JAMES M. HAIT.